(12) United States Patent
Jacobsen et al.

(10) Patent No.: US 7,685,500 B2
(45) Date of Patent: Mar. 23, 2010

(54) FORWARD ERROR CORRECTION CODING IN COMMUNICATION NETWORKS

(75) Inventors: Eric A. Jacobsen, Scottsdale, AZ (US); John S. Sadowsky, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 1624 days.

(21) Appl. No.: 10/723,133

(22) Filed: Nov. 25, 2003

(65) Prior Publication Data

US 2005/0111345 A1    May 26, 2005

(51) Int. Cl.
    *H03M 13/00*    (2006.01)
(52) U.S. Cl. .................................. 714/774; 714/779
(58) Field of Classification Search ................ 714/774, 714/779
    See application file for complete search history.

(56) References Cited

U.S. PATENT DOCUMENTS

| | | | | |
|---|---|---|---|---|
| 5,218,622 | A * | 6/1993 | Fazel et al. ................. | 375/240 |
| 5,731,840 | A * | 3/1998 | Kikuchi et al. ......... | 375/240.16 |
| 5,836,003 | A * | 11/1998 | Sadeh .......................... | 341/51 |
| 6,396,423 | B1 | 5/2002 | Laumen et al. | |
| 6,437,711 | B1 * | 8/2002 | Nieminen et al. ............. | 341/67 |
| 6,724,327 | B1 * | 4/2004 | Pope et al. ..................... | 341/67 |
| 6,757,337 | B2 * | 6/2004 | Zhuang et al. .............. | 375/267 |
| 7,016,296 | B2 * | 3/2006 | Hartman, Jr. ................. | 370/204 |

FOREIGN PATENT DOCUMENTS

| EP | 1202515 A2 | 5/2002 |
|---|---|---|
| WO | WO 01/26254 A1 | 4/2001 |

OTHER PUBLICATIONS

Intel Corp, Intel Tech. Journal, "High-Throughput Wireless LAN Air Interface", vol. 7, Issue 03, Aug. 19, 2003, pp. 47-57.
J. Bingham Frank van der Putten, "T1.413 Iss. 2", Standards Proj. for Interfaces Relating to Carrier to Customer Connection of ADSL Equip., T1E1.4/97-007R6, Sep. 26, 1997, 218 pgs.
Grunheid et al., "Adaptive Modulation for the HIPERLAN/2 Air Interface", 5th Intl. OFDM-Workshop 2000, Hamburg, 4 pgs.

* cited by examiner

*Primary Examiner*—Joseph D Torres
(74) *Attorney, Agent, or Firm*—Pillsbury Winthrop Shaw Pittman LLP (57) ABSTRACT

Methods, apparatus and systems are disclosed for block encoding/decoding information wireless networks having narrow decoding latency restrictions. A method includes identifying a length of information to be sent in a block code and encoding the information to be sent in the block code into one or more codewords, where the number of codewords and the amount of information encoded within each codeword is adjusted based on the identified length and to achieve a similar codeword error probability for each codeword considering available decoding time for decoding a last codeword is less than available decoding time for decoding a first codeword. In certain implementations low density parity check (LDPC) encoding may be used in combination with OFDM to provide reliable communications in a high throughput WLAN.

18 Claims, 5 Drawing Sheets

FORWARD ERROR CORRECTION CODING IN COMMUNICATION NETWORKS

BACKGROUND OF THE INVENTION

Embodiments of the present invention relate to forward error correction (FEC) codes for communicating information between electronic devices. More particularly, but not exclusively, embodiments of the invention relate to block error correction in communication networks with restrictive decoding latency requirements.

Most communications networks are designed to convey multiple communications simultaneously over each individual communication path, for example, a radio frequency (RF) channel or wired connection, using some type of modulation. In recent years, an increasing demand has arisen for efficient and reliable digital data transfers which assure correct data transmissions at as great a data rate as possible. Forward error correction (FEC) codes have been used in some communications systems for this purpose.

Codes are essentially digital data sequences derived from message sequences and used to convey message information. The rate of a code or "code rate" is the ratio of the number of information bits over the number of code bits. Generally, the lower the code rate, the more reliable the transmission given an equal number of decoding iterations.

In forward error correction (FEC), the transmitted codewords are encoded to provide the abilities of both detection and correction of errors occurring in a transmission, for example resulting from a noisy channel. The receiver in a communication system can recover all the information in the codewords by itself and thus coding lends advantages to high speed communication systems and/or those requiring synchronous communications.

For block coding, as opposed to convolutional coding, an encoder divides the information to be sent into message blocks of length k. In binary block encoding, each message block is represented by a binary k-tuple $u=(u_1, u_2, \ldots, u_k)$ called a "message," thus there are $2^k$ different possible messages altogether. The encoder transforms each message m independently into an n-tuple $c=(c_1, c_2, \ldots, c_n)$ called a "codeword." Therefore, there are $2^k$ different possible codewords at the encoder output. The set of $2^k$ codewords of length n is called a (n, k) "block code." The code rate (R) using the foregoing denotations is thus R=k/n.

Block coding is typically not used in networks which have narrow decoding latency requirements. For example, in networks in which a response (e.g., an ACK) is used to verify that the message has been correctly received before processing a next message, only a short interval may be allowed for completing processing (for example processing such as, demodulation, FEC and/or cyclic redundancy checks (CRCs)) of the received block code. This short interval is known as a short interframe space (SIFS) in certain wireless architectures. The SIFS requirement dictates that only a short amount of time (for example, 1-3 microseconds) is available to be used for decoding from the reception of the last information bit until a response is generated.

Block encoding has not been used for networks with these type of decoding latency restrictions since the decoding time, and thus the number of decoding iterations, that can be used to decode a last codeword in a block code would be significantly limited, for example by the SIFS requirement. If the code rate for each codeword in a block code is the same, and if the last codeword is decoded with fewer decoding iterations than previous codewords in the block, the codeword error probability (sometimes referred to as bit error rate (BER)) for the last codeword will be higher than for the previous codewords in the block code. This results in an unbalanced codeword error probability within each block code, which is undesirable.

Networks having narrow decoding latency requirements such as SIFS restrict the available decoding time, and thus the number of decoding iterations, that can be used for decoding block codes; particularly for networks having high data transfer speeds and variable length packets or messages such as those used in protocols compatible with the Institute for Electrical and Electronic Engineers (IEEE) 802.11 standards for wireless local area networks (WLANs).

Accordingly, a technique for block coding messages in high throughput communication networks having restrictive decoding latency requirements is desired.

BRIEF DESCRIPTION OF THE DRAWING

Aspects, features and advantages of the present invention will become apparent from the following description of the invention in reference to the appended drawing in which like numerals denote like elements and in which.

DETAILED DESCRIPTION OF THE INVENTION

While the following detailed description may describe example embodiments of the present invention in relation to wireless networks utilizing Orthogonal Frequency Division Multiplexing (OFDM) modulation, the embodiments of present invention are not limited thereto and, for example, can be implemented using wired networks and/or other modulation schemes where suitably applicable.

The following inventive embodiments may be used in a variety of applications including transmitters and receivers of a radio system, although the present invention is not limited in this respect. Radio systems specifically included within the scope of the present invention include, but are not limited to: wireless local area network (WLAN) devices and wireless wide area network (WWAN) devices including network interface devices and peripherals such as network interface cards (NICs), base stations, access points (APs), gateways, bridges, hubs and cellular radiotelephones. Further, the radio systems within the scope of the invention may include cellular radiotelephone systems, satellite systems, personal communication systems (PCS), two-way radio systems, one-way pages, two-way pagers, personal computers (PC), personal digital assistants (PDA), personal computing accessories (PCA) and all future arising systems which may be related in nature and two which the principles of the invention could be suitably applied.

Figure 1:
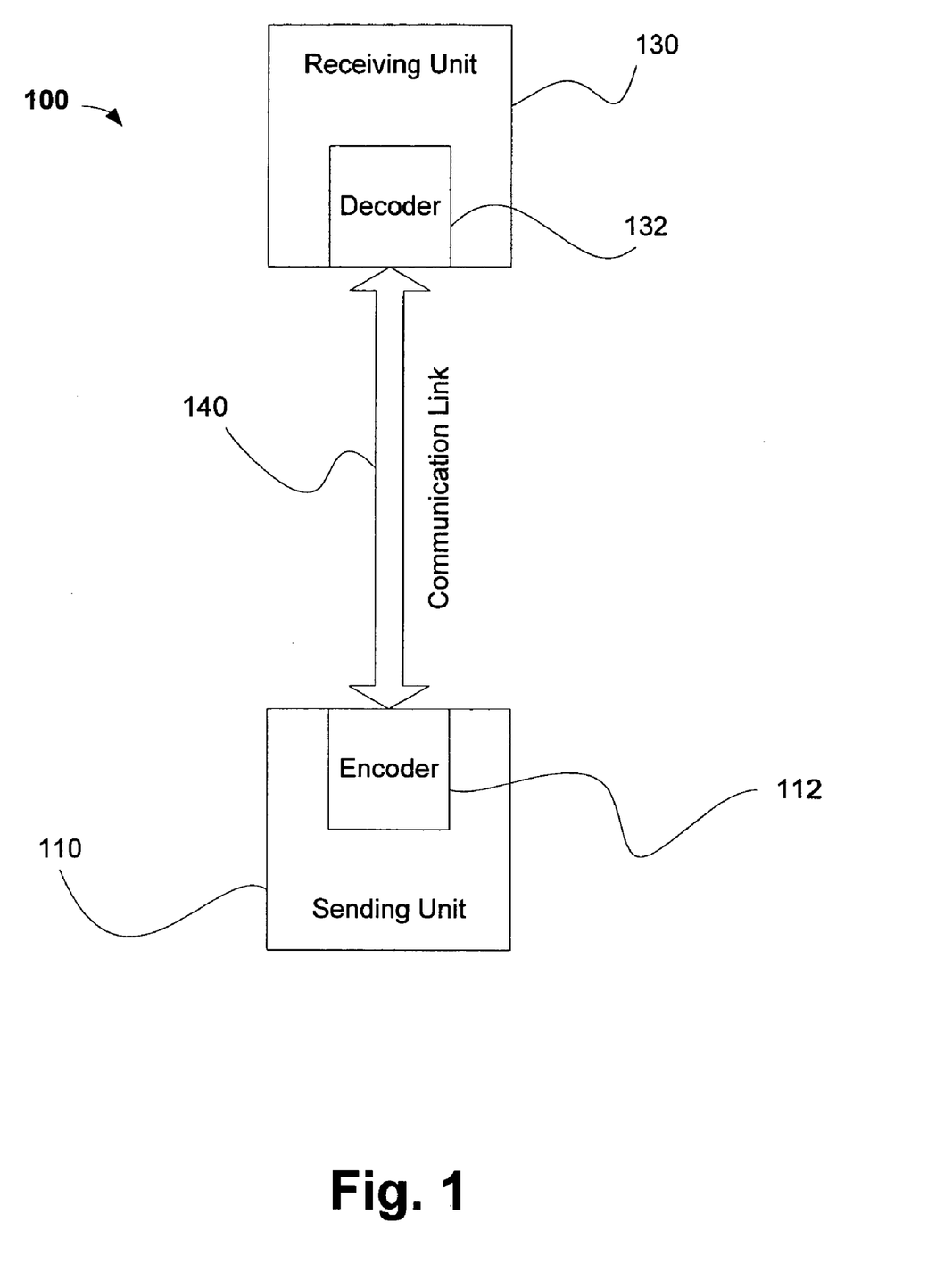
FIG. 1 is a block diagram illustrating a communications system in accordance with one embodiment of the present invention.

Turning to FIG. 1, a system 100 according to one embodiment of the invention includes a sending unit 110 and a receiving unit 130. Sending unit 130 is configured to send information to receiving unit 130 over a communications link 140.

Sending unit 110 includes (either internally or externally thereto) at least one encoder 112 for block encoding information and sending the encoded information over communication link 140 to receiving unit 130. Sending unit 110 may be any component, device or combination of components for accomplishing this function including, but not limited to, a NIC, an AP, a base station or any of the radio system devices mentioned above or any individual component or combination of components in these devices. In one implementation, sending unit 110 includes a wireless transmitter or transceiver configured to send information in a format compatible with one or more of the IEEE 802.11 protocols for WLAN, although the invention is not limited in this respect. Sending unit 110 may or may not also include the one or more antennas required for various wireless implementations. Block encoder 112 is configured to encode information into block codes in accordance with one or more of the processes described hereafter.

Receiving unit 130 receives information from sending unit 110 over communication link 140 and includes (either internally or externally) at least one decoder 132 for performing decoding iterations on received block codes. Receiving unit 130 may be any component, device or combination of components for accomplishing this purpose including, but not limited to, a NIC, an AP, a base station or any of the radio system devices described above or any components in these devices. In one implementation, receiving unit 130 includes a wireless receiver or transceiver configured to receive information in a format compatible with one or more of the IEEE 802.11 protocols for WLAN, although the embodiments of the present invention are not limited in this respect. Receiving unit 130 may or may not also include the one or more antennas required for wireless implementations. Decoder 112 is configured to decode information in received block codes in accordance with any of the processes described hereafter.

Communication link 140, as its nomenclature implies, serves as a link for communications between sending unit 110 and receiving unit 130 and/or any other network devices (not shown) which may be present in system 100. Communication link 140 may be any wired path, wireless (including radio frequency and/or infrared) path or combination thereof, which may include any hardware and/or software components (e.g., repeaters and/or routers) necessary or desired for establishing and/or maintaining communications between sending unit 110 and receiving unit 130. In one example wireless implementation, communication link 140 may be a modulated multi-carrier signal in a wireless broadcast.

An example multi-carrier modulation technique which may be used for wireless transmissions over communication link 140 is known as Orthogonal Frequency Division Multiplexing (OFDM), although the present invention is not limited in this respect. OFDM is capable of transmitting large amounts of digital data over a radio wave and works by splitting the radio signal into multiple small sub-signals that are then transmitted simultaneously at different frequencies to the receiver.

Figure 2:
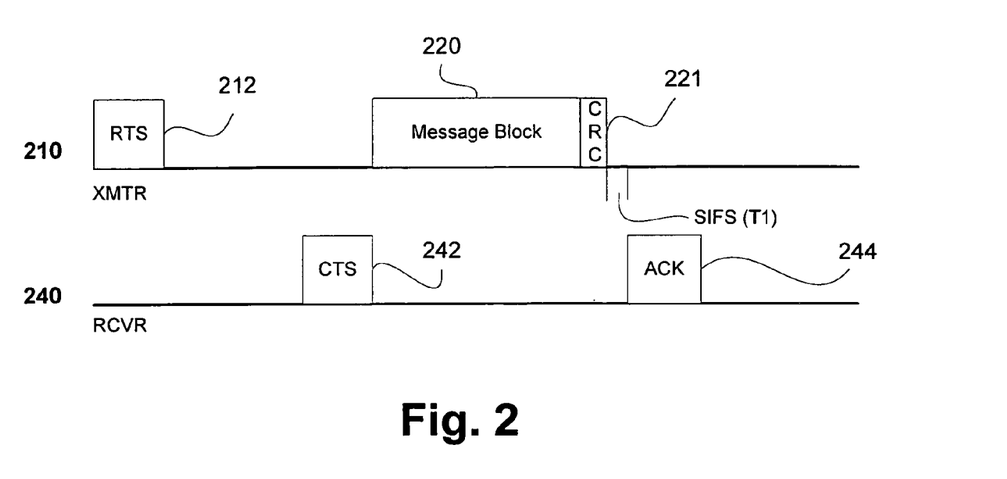
FIG. 2 is a sequence diagram for communications in a wireless network according to one embodiment of the present invention.

Turning to FIG. 2, example timelines 210, 240 (which are not intended to represent an actual time scale) illustrate the sequence of communications between a transmitter (XMTR) and receiver (RCVR) in a communications system (for example, system 100 in FIG. 1) using carrier sense multiple access with collision avoidance (CSMA/CA) protocols according to one embodiment of the present invention.

In this example implementation, the transmitter may send a request to send (RTS) message 212 to the receiver requesting to send information over the network. When the receiver has available processing time, the receiver replies with a clear to send (CTS) message 242. When the CTS message 242 is provided, the transmitter sends a block encoded message 220 (also referred to as a block code) which may optionally include a cyclic redundancy check 221 or other error detection/correction mechanism. At this point, the receiver has only time interval T1 (for example, a SIFS) to finish processing message 220 in order to send an acknowledgement (ACK) message 224 so it can begin processing another message. As previously mentioned, the receiver must complete all processing, e.g., demodulating, FEC, and CRC, during time interval T1. It is also possible that the use of RTS/CTS is not required for sending informaiton. For example, if the system is lightly loaded and has not seen any evidence of collisions due to interference, only data or acknowledgement sequences may appear.

Figure 3:
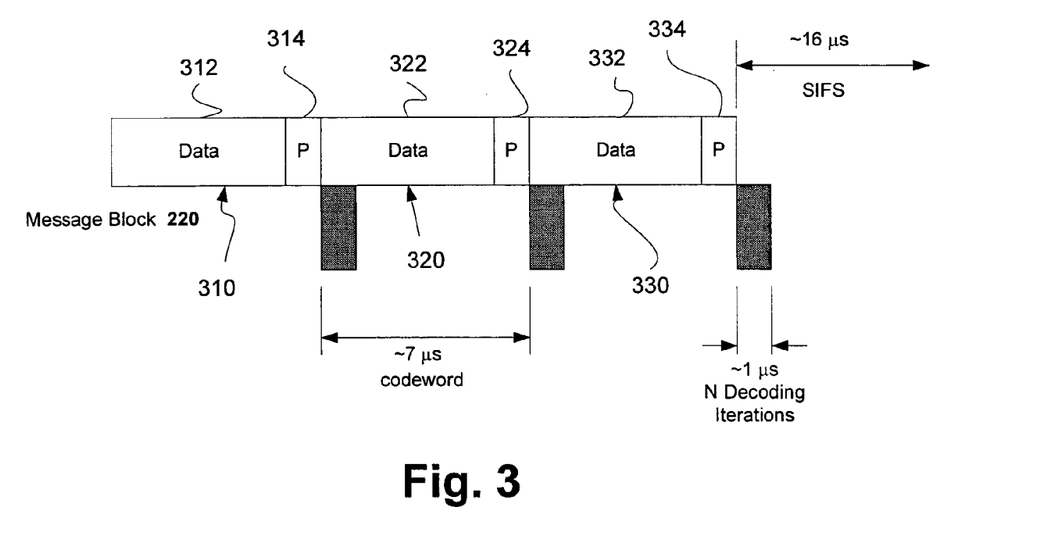
FIG. 3 is a timing diagram illustrating a bock code with decoding latency restrictions imposed by a SIFS requirement.

Referring to FIG. 3, block message 220 includes one or more block encoded codewords 310, 320, 330. Each codeword may include a data portion 312, 322, 332 for carrying a data payload (Data) and an error detection portion 314, 324, 334 for carrying error detection information such as a parity check value (P). One way to maintain balance in the codeword error probability for all codewords in block message 220 may be to set the decoding time, and hence the number of decoding iterations which may be performed within that time, for decoding each codeword 310, 320 to be the same as those allowed on a last included codeword (e.g., codeword 330), which is inherently limited due to the decoding latency restrictions or the network, e.g., the SIFS limitations. FIG. 3 shows a timing example for an advanced (next generation) WLAN system that supports a physical layer data rate of 240 Mbps; however, the embodiments of the present invention are in no way limited to the specifics of this example. In this example, each codeword 310, 320, 330 may be encoded as a low density parity check (LDPC) codeword of maximum length (2000 (total), 1600 (data)) bits which takes approximately 6.7 microseconds to transmit.

In the receiver, the SIFS turnaround time requires that the last codeword 330 of the multi-codeword block code 220 be decoded within approximately 1-2 microseconds of the reception of the last bit of the codeword 330. If this requirement is used to architect the decoder (e.g., decoder 132; FIG. 1), each codeword 310, 320 and 330 will be decoded with a duty cycle of about ⅐, wherein N number of decoding iterations can be completed within the one microsecond decoding time (shown in FIG. 3 by gray boxes).

However, limiting the number of decoding iterations for codewords 310, 320 to be the same as the number of iterations allowed for decoding the last codeword 330 in the 1 microsecond limit may result in an undesirably high overall BER as well as waste decoder capacity. It can be observed from FIG. 3 that the decoder in this example would be idle for nearly 6 microseconds between decoding each codeword 310, 320, 330.

However, since the decoding latency imposed by SIFS is only relative to the last codeword 330 in the block code 220, the decoder idle time for the previous codewords 310, 320 be used to compute more decoding iterations (in this example approximately 7*N total iterations) for the codewords 310 and 320 and improve the overall performance of the decoder. However, since the last codeword must still be decoded within one microsecond, the last codeword could not be decoded with more than N iterations and thus the last codeword 330 would have a higher probability of codeword error than the previous codewords 310, 320. This results in an unequal error protection scheme that, while potentially having improved overall BER as compared to decoding all codewords with the number of decoding iterations limited by the SIFS turnaround time, is generally undesirable.

Figure 4:
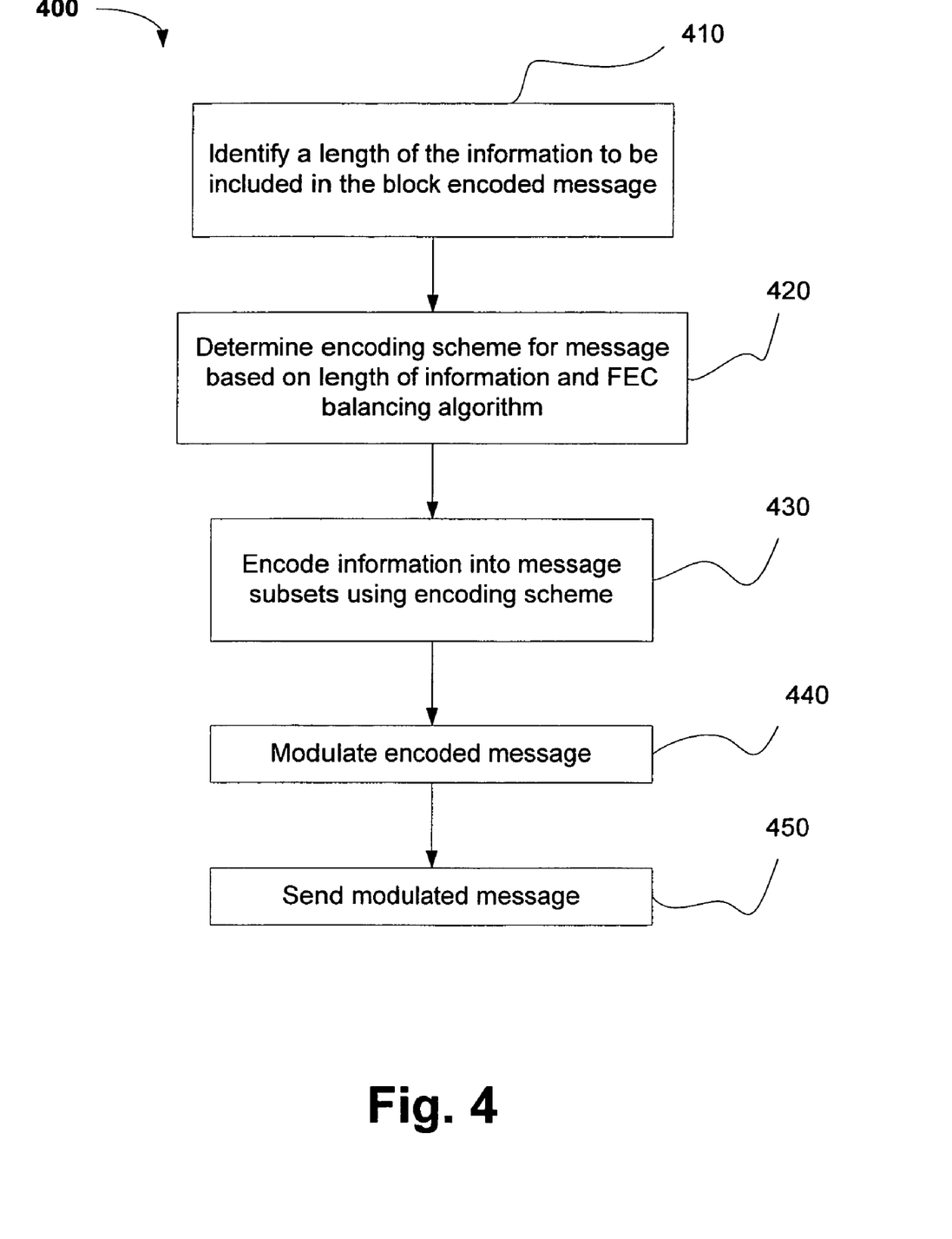
FIG. 4 is block diagram showing a method of for sending information in block codes in a communications network having restrictive decoding latency requirements.

Referring to FIG. 4, another approach to block coding in a restrictive decoding latency network is to balance the overall error protection for each codeword to be sent in a message but without restricting the number of decoding iterations of all codewords to the amount of iterations for which the last codeword is limited due to restrictive decoding latency requirements such as SIFS.

A method 400 for sending block encoded messages in this approach generally includes identifying 410 the overall length of the information in to be sent in a block code; calculate 420 a balanced encoding scheme based on the identified length and a forward error correction (FEC) balancing algorithm; and encoding 420 the information into one or more encoded codewords of the message segment based on the calculated encoding scheme.

Method 400 may further include modulating the block code using a multi-carrier modulation format such as OFDM, although the embodiments of the invention are not limited in this respect, and sending 430 the modulated encoded segment over a communications channel or link.

Calculating 420 the balanced encoding scheme generally includes dividing the information to be sent into subsets to be encoded into codewords in a manner that, when two or more codewords are needed to convey the length of information to be sent (determined based on the length of the information to be sent and the capacity of the data field for each codeword), at least the last codeword in the block code will generally have a code rate that is lower than one or more previous codewords in the bock code, but which will have a comparable codeword error probability during decoding, considering the fewer number of decoding iterations available to be performed on the last codeword.

In one example implementation for sending variable length messages, the overall length of information that can be sent in a block code can be any size from about 64 byes (for example, an ACK with CRC) to 12000 bytes or larger. The embodiments of the present invention are configured to encode the variable length block codes in a consistent manner so the receiver can know how to reconstruct the information or data field from the encoded transmitted data. In one example embodiment, for WLAN, each single medium access control (MAC) service data unit (MSDU) (or MAC protocol data unit (MPDU)) covered by a single CRC checksum is preferably encoded as one block code. In other words, the data boundary of an MSDU is respected by the encoder.

In this embodiment, which is preferably compatible with the IEEE 802.11 MAC layer, physical layer convergence protocol (PLCP) headers, which are typically less than 64 bytes, may be encoded using a Viterbi decoder at R=½ and binary phase shift keying (BPSK) modulation. In other embodiments the information is encoded with an LDCP encoder and modulated with OFDM (although LDPC and Viterbi encoding could both be used depending on the length of the information to be sent in the block code). The MSDU length field indicated in a PLCP header, in this embodiment, is all that is needed for identifying the length (Length) of the information sent in the block code and for calculating the encoding scheme using the following example FEC balancing algorithm:

1. If Length<=a maximum data field size (D) allocated for each codeword or codeword (for example 1600 bits or 200 bytes), then the codeword is shortened as necessary to accommodate the size of the data, for example the data field in the MSDU;

2. If Length>D (e.g., 1600 bits) and <=2*D (e.g., 3200 bits), divide the data field in two approximately equal data portions and encode each portion as a codeword (for example, as an LDPC codeword) that is shortened, if applicable, to accommodate each data portion. In one implementation, if the total number bytes is odd, the even-length half of the bytes resulting from the division is preferably encoded into the first codeword, although this is not required;

3. If Length>2*D bits (e.g., 3200 bits or 400 bytes), then compute N=modulo (Length, D) in bits:
    (a) If N is less than 0.5*D bits, encode the first L−(N+D) information in full-length (D), unshortened codewords, and encode the remaining N+D information using rule #2; else
    (b) N>0.5D bits, encode the first Length−N bits using full-length (D) unshortened codewords and encode the remaining N bits using rule #1.

In certain block encoding formats, the actual physical size of the data payload allocated for each codeword may be predetermined and thus, referring to the foregoing algorithm, the term "shortened" may mean stuffing an unused portion of the fixed block length with zeroes. Additionally, the foregoing algorithm is merely one example possibility for balancing encoding of message information into codewords. The embodiments of the present are not limited to the specific example algorithm described above; rather the FEC balancing algorithm could be any set of rules for encoding codewords in a block code in a manner that, during decoding, each codeword will have comparably similar BERs given the possibility that one or more codewords in the message will be decoded with a different number of decoding iterations than one or more other codewords in the message. For example, if desired, in Rule 2 above, when the length of information would completely or nearly fill the allocated capacity of both codewords (e.g., 3200 bits) the algorithm may cause an additional (or third) codeword to be added and divide the information that would have filled the last codeword between the two last codewords in order to achieve a comparable BER with fewer decoding iterations than the first codeword in the block. Other modifications could be possible without departing from the scope of the present invention.

In preferred embodiments, the balancing algorithm may ensure that the number of codewords and/or the amount of information in each codeword are selected so that the code rate of each codeword never falls below a minimum threshold value. This threshold value is discretionary and may vary from system to system.

Figure 5:
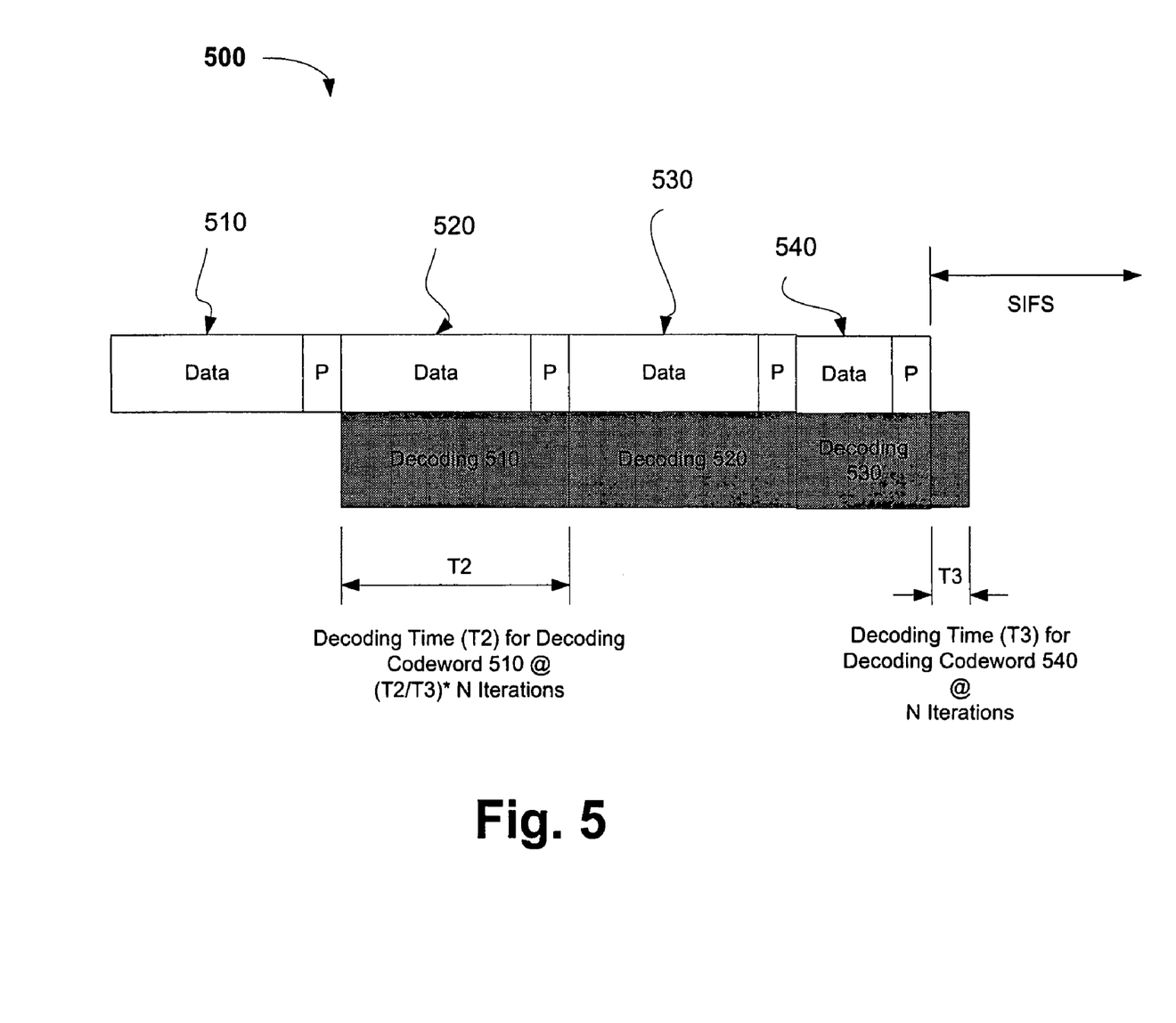
FIG. 5 is a timing diagram illustrating balanced block encoding according to one embodiment of the present invention.

Turning to FIG. 5, a portion of an example block code 500 is shown in which subsets or codewords 510, 520, 530 are encoding according to one embodiment of the present invention. In this example, the codewords are sized, for example shortened from the maximum available data field size, to allow a last codeword 540 to be added with a code rate lower than the first codeword 510. The lower code rate of the last codeword 540 is set so that the last codeword will have the same or similar codeword error probability as previous codewords 510, 520 with a fewer number (N) of decoding iterations than previous codewords 510, 520. In one example implementation, codewords 510 and 520 are decoded with T2/T3*(N) iterations to minimize decoder idle time and to reduce the codeword error probability as much as possible.

In this example, the last codeword 540 is shorter than the previous codeword 530 so the penultimate codeword 530 may also have less decoding time (e.g., <T2; FIG. 5) than the previous codewords 510, 520. For simplification, the reduced decoding time of codeword 530, and hence the slight increase in codeword error probability for codeword 530 could be ignored.

Alternatively, the penultimate codeword (e.g., 530) could also have its code rate reduced (realizing it will have fewer decoding iterations than previous codewords decoded in time T2) in order to maintain a same or approximately same codeword error probability for all codewords in message block 550. In other instances, the decoding time for each of previous codewords 510, 520 could be limited to be less than T2, in order to maintain equal performance. In any of the foregoing cases the increased decoding time and subsequent increase in the number of decoding iterations for the first one or more codewords in the block code 500 increases the overall performance of the system by exploiting all available decoding time (see, for example, the contrast in decoding times between FIG. 3 with FIG. 5).

Figure 6:
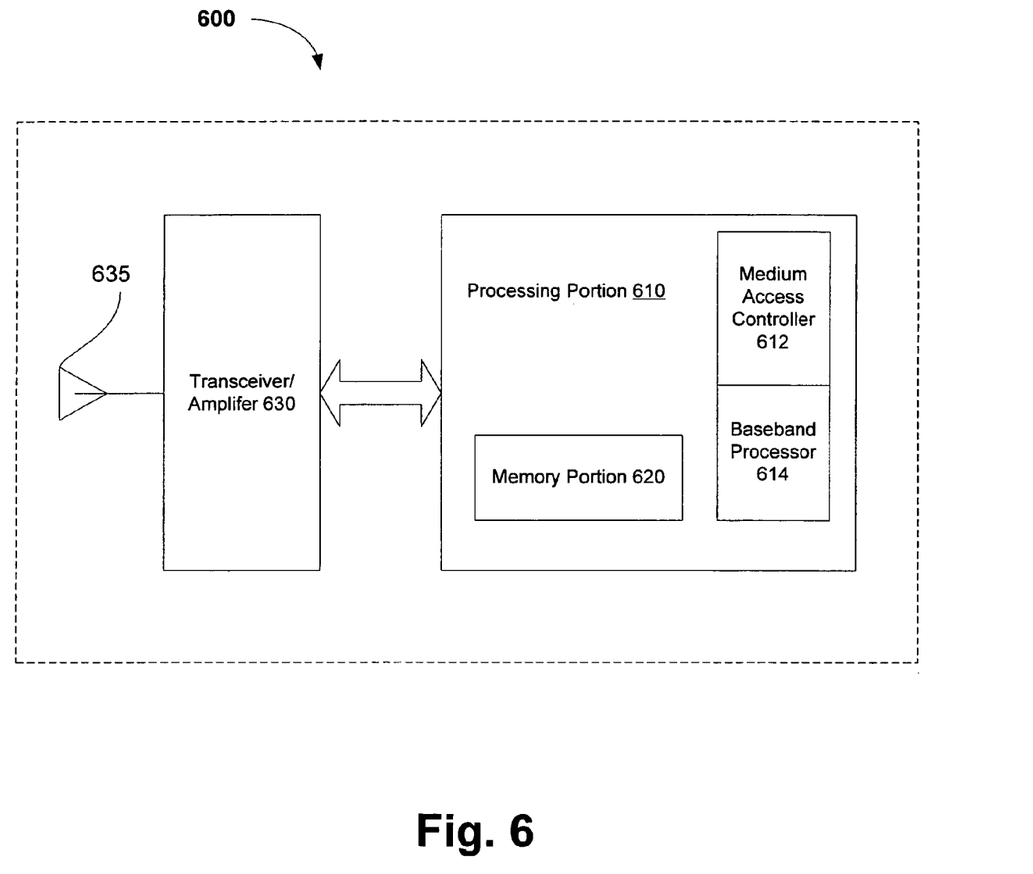
FIG. 6 is a block diagram of a wireless device according to one embodiment of the present invention.

Referring to FIG. 6, a communication device 600 using FEC to send and/or receive communications may generally include a code processing portion 610, and a memory portion 620 accessible by processing portion 610. Memory portion 620 may be configured to store machine readable code and/or other data which processing portion 610 uses to perform one or more of the FEC encoding/decoding processes described herein. Processor portion 610 and memory portion 620 can be any component or combination of components for performing these functions. Device 600 may or may not include other communication components such as a medium access controller 612, a baseband processor 614, transceiver and/or amplifier 630 or one or more antennas 635.

In certain embodiments, code processing portion 610 and/or memory portion 620 may be implemented using one or more programmable devices such as a microprocessor, microcontroller or field programmable gate array. Additionally and/or alternatively, code processing portion 610, and optionally memory portion 620 may be implemented in discrete circuit components or as one or more application specific integrated circuits (ASICs). Other implementations may also be possible and the principles of the invention are not limited to any particular hardware, software or firmware configuration.

One major advantage of using a FEC balancing algorithm in encoder and decoder architectures for example WLAN implementations, such as those compatible with various IEEE 802.11 specifications, is that the length of the data field, which may be transmitted in the header of each block message, is all that is needed to decode the block message. Accordingly, no additional information would be necessary for decoding.

Unless contrary to physical possibility, the inventors envision the methods described herein: (i) may be performed in any sequence and/or in any combination; and (ii) the components of respective embodiments combined in any manner.

Although there have been described preferred embodiments of this novel invention, many variations and modifications are possible without departing from the scope of the invention and the embodiments described herein are not limited by the specific disclosure above, but rather should be limited only by the scope of the appended claims and their legal equivalents.

The invention claimed is:

1. A method of encoding information, the method comprising:
   identifying a length of information to be sent in a block code; and
   encoding the information to be sent in the block code into two or more codewords comprising a first codeword and a last codeword, the encoding comprising:
   balancing codeword lengths to be approximately equal for at least a portion of the two or more codewords, before the last codeword; and
   setting code rates of the two or more codewords such that the last codeword has a lower code rate than the first codeword,
   wherein a substantially similar codeword error probability is achieved for each codeword; and
   further wherein a time for decoding the last codeword is less than a time for decoding the first codeword.

2. The method of claim 1 wherein encoding is performed by a low density parity check (LDPC) encoder.

3. The method of claim 1 wherein encoding includes setting the code rates of the one or more codewords based on a forward error correction algorithm.

4. The method of claim 3 wherein the forward error correction algorithm determines:
   (A) if the length is less than or equal to X bits, where X is a positive integer, then one codeword is used; else,
   (B) if the length is greater than X bits and less than or equal to Y bits, where Y is a positive integer greater than X, then two codewords are used and wherein the information to be sent in the block code is divided substantially equally between the two codewords; else,
   (C) if the length is greater than Y bits, then three or more codewords are used and wherein a code rate of the last codeword is set lower than a code rate of the first codeword.

5. The method of claim 4 wherein if an amount of information in the last codeword would be less than one half of an amount of information in the first codeword, (C) further comprises dividing a remainder of the information to be sent substantially equally between last two codewords.

6. The method of claim 1 wherein encoding includes setting code rates of two last codewords to be lower than a code rate of the first codeword.

7. The method of claim 1 further comprising modulating the block code into an orthogonal frequency division multiplexing (OFDM) multi-carrier signal.

8. The method of claim 1 further comprising broadcasting the encoded block code using one or more antennas.

9. The method of claim 1, wherein the encoding is based on a balancing algorithm configured to ensure that a number of codewords and/or an amount of information in each codeword are selected so that a code rate of each codeword never falls below a minimum threshold value.

10. The method of claim 1, further comprising balancing an overall error protection for each codeword without restricting a number of decoding iterations of all codewords to an amount of iterations for which the last codeword is limited due to a restrictive decoding latency requirements.

11. An apparatus for encoding information, the apparatus comprising:
    a controller configured to identify a length of information to be sent in a block code; and
    an encoder configured to encode the information to be sent in the block code into two or more codewords comprising a first codeword and a last codeword, wherein the encoder is configured to balance codeword lengths to be approximately equal for at least a portion of the two or more codewords, before the last codeword and configured to set code rates of the two or more codewords such that the last codeword has a lower code rate than the first codeword, wherein a substantially similar codeword error probability is achieved for each codeword and further wherein a time for decoding the last codeword is less than a time for decoding the first codeword.

12. The apparatus of claim 11, wherein the encoder is a low density parity check encoder.

13. The apparatus of claim 11, wherein the encoder is configured to set the code rates of the one or more codewords based on a forward error correction algorithm.

14. The apparatus of claim 13, wherein the forward error correction algorithm is configured to determine:
   (A) if the length is less than or equal to X bits, where X is a positive integer, then one codeword is used; else,
   (B) if the length is greater than X bits and less than or equal to Y bits, where Y is a positive integer greater than X, then two codewords are used and wherein the information to be sent in the block code is divided substantially equally between the two codewords; else,
   (C) if the length is greater than Y bits, then three or more codewords are used and wherein a code rate of the last codeword is set lower than a code rate of the first codeword.

15. The apparatus of claim 14, wherein the forward error correction algorithm is further configured to determine if an amount of information in the last codeword would be less than one half of an amount of information in the first codeword, (C) divide a remainder of the information to be sent substantially equally between last two codewords.

16. The apparatus of claim 11 wherein the encoder is configured to set code rates of two last codewords to be lower than a code rate of the first codeword.

17. The apparatus of claim 11, further comprising:
   a modular configured to modulate the block code into an orthogonal frequency division multiplexing (OFDM) multi-carrier signal.

18. The apparatus of claim 11, further comprising:
   a transmitter configured to transmit the encoded block code using one or more antennas.

* * * * *